A. S. FOX.
NUT LOCK.
APPLICATION FILED MAY 22, 1911.

1,036,991.

Patented Aug. 27, 1912.

WITNESSES:
Chas. H. Hughes
E. Domer

INVENTOR.
Aaron S. Fox
BY Harry D. Wallace
ATTORNEY.

UNITED STATES PATENT OFFICE.

AARON S. FOX, OF SYRACUSE, NEW YORK.

NUT-LOCK.

1,036,991. Specification of Letters Patent. Patented Aug. 27, 1912.

Application filed May 22, 1911. Serial No. 628,835.

*To all whom it may concern:*

Be it known that I, AARON S. FOX, a citizen of the United States, residing at Syracuse, in the county of Onondaga and State of New York, have invented certain new and useful Improvements in Nut-Locks, of which the following is a specification.

This invention relates to improvements in locking devices, designed for use in connection with bolts and nuts generally, and the invention relates particularly to a device for locking the sleeves and bolts or screws of turn-buckles.

The object of the invention is to provide a novel, simple, convenient and inexpensive device of the class, consisting of a flexible wire key or pin, which is arranged to lie in a groove formed in the threaded aperture of the sleeve or nut of a turn-buckle, one end of the key being bent to provide means for interlocking said part with the sleeve or nut, for preventing turning or shifting of the key, the opposite end of the key remaining free.

A further object is to so arrange the parts of the device so that after the bolt has been screwed into the sleeve or nut, the free end of the key may be bent or folded upon itself and then inserted into the nearest of a number of spiral grooves which are formed lengthwise in the threaded surface of the bolt, for preventing the bolt or the sleeve from turning in the direction for loosening the said parts.

The features and parts of the invention will be understood from the detailed description which follows, and by reference to the accompanying drawing, which forms a part of this specification, and in which—

Figure 1:
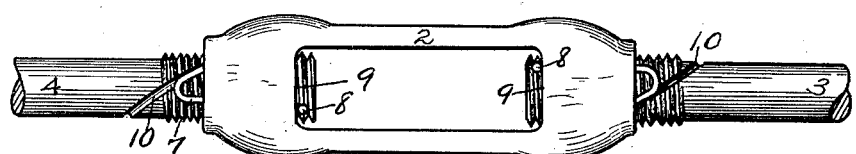
Figure 2:
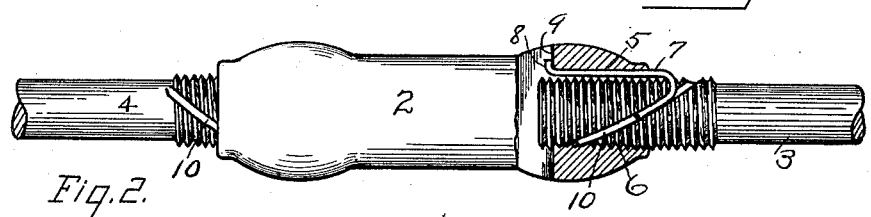
Figure 3:
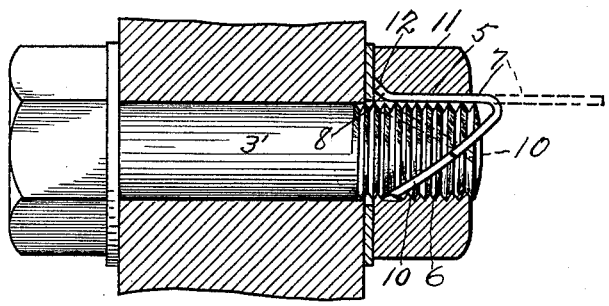
Figure 4:
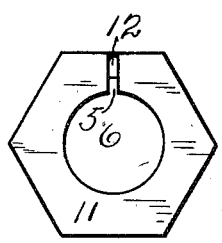
Figure 5:
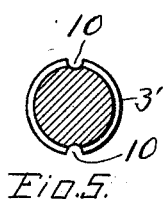
Figure 6:
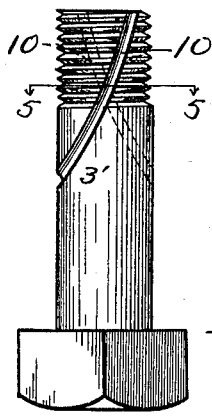

Figure 1 is a plan view of a turn-buckle, having my improvement applied, the latter being in locking position. Fig. 2 is a side elevation and part section of the device shown in Fig. 1; showing the construction, arrangement and operation of the parts. Fig. 3 is a sectional view; showing the application of my locking device to a common bolt and nut. Fig. 4 is an end view of a hexagon nut; showing the groove and socket to receive the key. Fig. 5 is a cross-section, taken on line 5—5 of Fig. 6. Fig. 6 is an elevational view of a screw-bolt.

Similar characters of reference designate corresponding parts throughout the several views.

In the drawings, Figs. 1 and 2 illustrate a turn-buckle of ordinary construction, comprising a sleeve 2 and bolts or screws 3 and 4. The opposite ends of the sleeve are threaded internally to receive the bolts 3 and 4, which are preferably provided respectively with right and left hand threads. One end of the sleeve 2 may be fitted with the usual swivel (not shown), and my improved locking device may be applied to the opposite end, instead of at both ends as herein shown. 5 represents a straight groove or slot which is cut or otherwise formed in the threaded aperture 6 of the sleeve, extending longitudinally across the threads, the said slot being formed deeper than the said threads, to provide a clear passage or way for a locker or key 7. The key consists of a piece or length of flexible wire, having one end bent at right angles to the body of the key, to form a hook or foot 8, which engages the inner surface or shoulder 9 of the sleeve, for preventing the shifting or withdrawal of the wire, except in one direction. The wire key 7 may be inserted in the slot 5 either before or after the bolt is screwed into the sleeve. The key or pin 7 is preferably about double the length of the threaded hole in the sleeve, and when first applied to the slot 5 should be substantially straight, as indicated by the dotted lines in Fig. 3. The depth of the slot 5 below the threads is intended to be about equal to the diameter of the pin 7, so that when the pin is lying in the slot, the bolt may be screwed into the nut without interference. 10 represents a pair of oppositely facing slots or grooves which are formed lengthwise in the threaded body of the bolt, and these grooves are intended to have a depth below the bottom of the threads corresponding to the thickness or size of the key 7. The grooves 10 are preferably cut in the form of a spiral, the pitch of which is preferably the reverse of that of the threads of the bolt, as shown in Figs. 1 and 2. To lock the nut and bolt together, after the said parts have been screwed in place, the portion of the wire key 7 which projects above or beyond the outer end of the nut or sleeve is bent, by any suitable means, upon itself for forming a large loop or curve, which brings the end of the wire down into line with the nearest of the grooves 10. The end of the wire 7 may then be inserted in the groove of the bolt, then by striking the top of the loop a few blows, with any suitable tool, the free end of the wire is forced farther and farther into the groove 10 until the nut and bolt are securely locked together. The wire of the pin or key 7 should be flexible and pliable enough to stand bending, as described, without fracture. If desired, when removing the nut or bolt, the wire key may be withdrawn from the groove 10 of the bolt, by any suitable method, then straightened and used repeatedly for locking the parts together. Under the provision of the spiral grooves 10, the obliquity or angularity of the said grooves, which almost or entirely encircle the threaded portion of the bolt, tends to increase the chances of the slots 5 and 10 coinciding with each other, when the nut and bolt are screwed into place. By this arrangement fewer slots or grooves in the bolts are required, than when they are formed straight as heretofore. As the nut travels over the successive threads of the bolt, the slot 5 registers with the grooves 10 at a different point in the circumference of the bolt, which would not be the case if the grooves 10 were straight. When the free end of the wire 7 is driven into the spiral grooves 10, the key becomes fixed or set at an angle relatively to the slot 5 of the nut, which tends to increase the resistance of the locking pin when subjected to any strain by reason of the jar or vibration of the parts, which in the absence of the locking device would sooner or later cause the parts to be shaken loose. When the wire key is driven into the groove 10, as illustrated in the drawings, the exposed portion of the loop lies closely against the threads of the bolt and does not interfere with the handling of the parts, and there is no danger of the key being accidentally withdrawn by coming in contact with other objects.

Bolts or nuts locked together by means of my improved device cannot jerk loose. The bolt and nut may, however, be separated without withdrawing the key 7, by the use of a stout wrench, but in that case the wire key will be sheared off or distorted, so as not to be fit for use again.

It is an object of the present invention to provide a comparatively light and inexpensive wire key, which may be produced without any special tools or work, and if the keys are used but once, the cost of replacing them will be a small item. In the present device, it is immaterial whether the slot 5 and either of the slots 10 coincide or not. The wire should be of sufficient length and strength to permit its free end to be bent over and driven into the nearest groove 10 without requiring the use of washers or other expedients for bringing the said slots into coincidence.

Figs. 3 to 6 inclusive illustrate the application of my improved locking device to the ordinary screw bolt and nut, which is practically the same as that shown in Figs. 1 and 2, except that the under side or face of the nut 11, is recessed at 12, to form a socket to receive the hook or foot 8 of the key 7, so as not to hinder the full engagement of the bottom of the nut when screwed down in place.

Having thus described my invention, what I claim as new and desire to secure by Letters Patent, is—

1. A locking device for nuts and screwbolts, comprising a pair of spiral grooves formed along the threaded portion of the bolt, the pitch of said grooves being contrary to the pitch of the threads of the bolt; a longitudinal slot formed in the threaded aperture of the nut, and a flexible wire pin having one end formed into a hook for engaging the bottom of the nut, the other end arranged to be bent at an acute angle and inserted entirely in one of the spiral grooves, beneath the threads of the bolt, substantially as described.

2. The combination with a bolt having the oppositely facing spiral grooves 10, of a nut having the slot 5, and the loose locking key 7 having one end formed into a hook for engaging the inner end of the nut for preventing longitudinal movement of the key in one direction, the other end of the key capable of being bent upon itself and driven into one of the grooves of the bolt for preventing the unscrewing of the bolt.

3. The combination with the sleeve of a turn-buckle having a longitudinal slot formed through the threads thereof, and deeper than said threads, of a bolt having a plurality of spiral grooves formed along the threaded portion thereof, the said grooves arranged at a pitch the reverse of the threads of the bolt, and a flexible wire pin having a hook on one end adapted to engage the inner end of the threaded portion of the sleeve, for preventing the turning or shifting of said pin, the opposite end of the pin being free to be bent at an acute angle to correspond to and to be driven into one of said spiral grooves, substantially as described.

In testimony whereof I affix my signature in presence of two witnesses.

AARON S. FOX.

Witnesses:
 HARRY DE WALLACE,
 WM. C. ANDERSON.

Copies of this patent may be obtained for five cents each, by addressing the "Commissioner of Patents, Washington, D. C."